United States Patent
Poirier et al.

(10) Patent No.: US 11,218,738 B2
(45) Date of Patent: Jan. 4, 2022

(54) METHOD AND APPARATUS FOR RESTRICTING BINARY-TREE SPLIT MODE CODING AND DECODING

(71) Applicant: INTERDIGITAL MADISON PATENT HOLDINGS, SAS, Paris (FR)

(72) Inventors: Tangi Poirier, Cesson-Sevigne (FR); Fabrice Leleannec, Cesson-Sevigne (FR); Fabien Racape, Cesson-Sevigne (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 16/336,261

(22) PCT Filed: Sep. 28, 2017

(86) PCT No.: PCT/EP2017/074694
§ 371 (c)(1),
(2) Date: Mar. 25, 2019

(87) PCT Pub. No.: WO2018/065302
PCT Pub. Date: Apr. 12, 2018

(65) Prior Publication Data
US 2019/0215537 A1    Jul. 11, 2019

(30) Foreign Application Priority Data

Oct. 5, 2016    (EP) .................................. 16306306

(51) Int. Cl.
*H04N 19/91*    (2014.01)
*H04N 19/176*    (2014.01)
(Continued)

(52) U.S. Cl.
CPC ............ *H04N 19/91* (2014.11); *H04N 19/119* (2014.11); *H04N 19/176* (2014.11); *H04N 19/33* (2014.11);
(Continued)

(58) Field of Classification Search
CPC .... H04N 19/119; H04N 19/176; H04N 19/33; H04N 19/46; H04N 19/503; H04N 19/593; H04N 19/70; H04N 19/91; H04N 19/96
See application file for complete search history.

(56) References Cited

U.S. PATENT DOCUMENTS

2003/0202602 A1    10/2003    Apostolopoulos et al.
2011/0310976 A1    12/2011    Wang et al.
(Continued)

FOREIGN PATENT DOCUMENTS

CN    101990104    3/2011
CN    103503461    1/2014
(Continued)

OTHER PUBLICATIONS

Chen et al., "Algorithm description of Joint Exploration Test Model 3 (JEM3)",3. JVET Meeting; May 26, 2016-Jan. 6, 2016; Geneva; (The Joint Video Exploration Team of ISO/IEC JTC1/SC29/WG11 and ITU-T SG.16) URL: http://phenix.int-evry.fr/jvet/,,No. JVET-CI00I, Jul. 2, 2016 (Jul. 2, 2016).

(Continued)

*Primary Examiner* — Jessica M Prince
(74) *Attorney, Agent, or Firm* — Ronald Kolczynski

(57) ABSTRACT

Binary tree split mode coding is performed while encoding digital video image blocks using a quad tree plus binary tree coding. The quadtree split can be represented by some combinations of horizontal and vertical binary tree split. Blocks are constrained to be split down to a minimum block (Continued)

size and with certain split constraints such that some redundant tree structures are avoided. Redundant syntax in coding the binary tree split mode syntax element is removed to provide coding efficiency.

17 Claims, 18 Drawing Sheets

(51) Int. Cl.
*H04N 19/70* (2014.01)
*H04N 19/503* (2014.01)
*H04N 19/46* (2014.01)
*H04N 19/33* (2014.01)
*H04N 19/593* (2014.01)
*H04N 19/119* (2014.01)
*H04N 19/96* (2014.01)

(52) U.S. Cl.
CPC ........... *H04N 19/46* (2014.11); *H04N 19/503* (2014.11); *H04N 19/593* (2014.11); *H04N 19/70* (2014.11); *H04N 19/96* (2014.11)

(56) References Cited

U.S. PATENT DOCUMENTS

| | | | |
|---|---|---|---|
| 2017/0280162 A1* | 9/2017 | Zhao | H04N 19/61 |
| 2019/0075328 A1* | 3/2019 | Huang | H04N 19/167 |
| 2019/0182498 A1* | 6/2019 | Yamamoto | H04N 19/157 |

FOREIGN PATENT DOCUMENTS

| | | |
|---|---|---|
| CN | 105453570 | 3/2016 |
| EP | 3306920 | 4/2018 |
| EP | 3306935 | 4/2018 |
| WO | WO2016091161 | 6/2016 |

OTHER PUBLICATIONS

Zheng (HiSilicon) et al., "TE3: Huawei & Hisilicon report on flexible motion partitioning coding", 2. JCT-VC Meeting; Jul. 21, 2010-Jul. 28, 2010; Geneva; (Joint CollaborativeTeam on Video Coding of ISO/IEC JTC1/SC29/WG11 and ITU-T SG.16 ), URL:http://wftp3.itu.int/av-arch/jctvc-site/ , ,No. JCTVC-B041, Jul. 23, 2010 (Jul. 23, 2010).
Chen et al., "Description of scalable video coding technology proposal by Qualcomm (configuration 1)", 11. JCT-VC Meeting; 102. MPEG Meeting; Oct. 10, 2012-Oct. 19, 2012; Shanghai; (Joint Collaborative Team on Mideo Coding of ISO/IEC JTC1/SC29/WG11 and ITU-T SG.16 ), URL: http://wftp3.itu.int/av-arch/jctvc-site/,,No. JCTVC-K0035,Oct. 2, 2012 (Oct. 2, 2012).
Luo et al., Fast Binary Partition Tree Based Variable-Size Block-Matching for Video Coding, Proceedings of the 2009 16th IEEE International Conference on Image Processing, pp. 609-612.
Suehring et al., JVET Common Test Conditions and Software Reference Configurations, JVET of ITU-T SG16 WP3 and ISO/IEC JTC1/SC29/WG11 2nd meeting: San Diego, USA, Feb. 20-26, 2016.
ITU-T H.265 (Apr. 2015), Series H: Audiovisual and Multimedia Systems Infrastructure of audiovisual services—Coding of moving video, High Efficiency Video Coding.
Chen et al., "Algorithm Description of Joint Exploration Test Model 3", Joint Video Exploration Team (JVET) of ITU-T SG 16 WP 3 and ISO/IEC JTC 1/SC 29/WG 11, Document: JVET-C1001_V3, 3rd Meeting: Geneva, CH, May 26-Jun. 1, 2016.

* cited by examiner

|  | Random Access Main 10 |  |  |
|---|---|---|---|
| Class D | -0.08% | 0.01% | 0.08% |
|  | Low delay B Main10 |  |  |
| Class D | -0.19% | 0.21% | -0.37% |
|  | Low delay P Main10 |  |  |
| Class D | -0.10% | -0.07% | -0.25% |

| | Y | U | V |
|---|---|---|---|
| Class A1 | -0.05% | 0.37% | 0.39% |
| Class A2 | -0.03% | -0.27% | 0.06% |
| Class B | -0.03% | 0.03% | 0.31% |
| Class C | -0.03% | 1.06% | 0.11% |
| Class D | -0.31% | -0.45% | 0.51% |
| Class E | 0.00% | 0.00% | -0.73% |
| Overall (Ref) | -0.08% | 0.13% | 0.15% |
| Class F (optional) | -0.08% | 0.02% | 0.56% |

METHOD AND APPARATUS FOR RESTRICTING BINARY-TREE SPLIT MODE CODING AND DECODING

FIELD OF THE INVENTION

The present principles relate to the field of digital video compression and coding.

BACKGROUND OF THE INVENTION

Aspects of the present embodiments aim at improved compression efficiency compared to existing video compression systems, such as ITU-T H.265 TELECOMMUNICATION STANDARDIZATION SECTOR OF ITU (10/2014), SERIES H: AUDIOVISUAL AND MULTIMEDIA SYSTEMS, Infrastructure of audiovisual services—Coding of moving video, High efficiency video coding, Recommendation ITU-T H.265, sometimes referred to as HEVC or simply H.265, and "Algorithm Description of Joint Exploration Test Model 3", Document JVET-C1001_v3, Joint Video Exploration Team (JVET) of ISO/IEC JTC1/SC29/WG11, $3^{rd}$ meeting, 26 May-1 Jun. 2015, Geneva, for example.

Emerging video compression tools include a Coding Tree Unit representation in the compressed domain, in order to represent picture data in a more flexible way in the compressed domain. The advantage of this more flexible representation of the coding tree is that it provides increased compression efficiency compared to the CU/PU/TU (Coding Unit/Prediction Unit/Transform Unit) arrangement of the HEVC standard.

The Quad-Tree plus Binary-Tree (QTBT) coding tool provides this increased flexibility. It consists in a coding tree where coding units can be split both in a quad-tree and in a binary-tree fashion. Such coding tree representation of a Coding Tree Unit is illustrated in FIG. 1.

The quadtree split can be represented by some combinations of horizontal and vertical Binary-Tree splitting. The same partition shape can also be generated by applying the horizontal and vertical binary split in different orders. In order to avoid some redundant tree structures a split constraint is used (splitConstrain=Horizontal means a horizontal split is forbidden).

The Binary-Tree is limited by the MinBTSize parameter, which is the imposed minimum size (in width or height) on the blocks issued from binary-tree splitting.

The embodiments described herein propose to remove the redundant syntax in coding the Binary Tree Split Mode syntax element.

SUMMARY OF THE INVENTION

These and other drawbacks and disadvantages of the prior art are addressed by the present principles, which are directed to a method and apparatus for digital video image coding that removes redundant syntax in some particular cases.

According to an aspect of the present principles, there is provided a method for decoding video image blocks in an entropy decoder. The method comprises determining whether a block is enabled to undergo binary splitting by checking syntax elements representative of a minimum block size and splitting constraints, and if binary splitting is not enabled, do not decode any further split mode flags for the block. The method further comprises decoding a first flag to determine whether the block is to be split if binary splitting is enabled, and determining whether horizontal or vertical splitting is allowed for the block if binary splitting is allowed by checking syntax elements representative of a minimum block size and horizontal and vertical splitting constraints. The method further comprises decoding a second flag to determine whether the block is split in a horizontal or vertical direction.

According to an aspect of the present principles, there is provided a method for encoding video image blocks in an entropy encoder. The method comprises determining whether a block is to undergo binary splitting by checking its block size relative to a minimum block size and whether there are any splitting constraints, and if binary splitting is not to be enabled, do not encode any further split mode flags for the block. The method further comprises encoding a first flag to indicate whether the block is to be split if binary splitting is enabled and determining whether horizontal or vertical splitting is allowed for the block if binary splitting is allowed by checking its block size relative to a minimum block size and whether there are horizontal and vertical splitting constraints, and encoding a second flag to indicate whether the block is split in a horizontal or vertical direction.

According to another aspect of the present principles, there is provided an apparatus for decoding video image blocks in an entropy decoder. The apparatus is comprised of a memory and a processor, configured to perform the steps of one of the methods described above.

According to another aspect of the present principles, there is provided a video signal formatted to include encoded data representative of a block in a picture comprising flags to indicate binary tree split mode coding by determining whether a block is enabled to undergo binary splitting by checking syntax elements representative of a minimum block size and splitting constraints, and if binary splitting is not enabled, do not decode any further split mode flags for the block, by decoding a first flag to determine whether the block is to be split if binary splitting is enabled, by determining whether horizontal or vertical splitting is allowed for the block if binary splitting is allowed by checking syntax elements representative of a minimum block size and horizontal and vertical splitting constraints, and by decoding a second flag to determine whether the block is split in a horizontal or vertical direction.

According to another aspect of the present principles, there is provided a nontransitory computer readable storage medium storing instructions which when executed by a processor cause the processor to perform the method according to any one of the above methods when the computer program is executed by one or more processors.

These and other aspects, features and advantages of the present principles will become apparent from the following detailed description of exemplary embodiments, which is to be read in connection with the accompanying drawings.

DETAILED DESCRIPTION

An approach for removing redundant syntax in video compression systems, for example, the Binary Tree Split Mode syntax element, is described herein.

Figure 1:
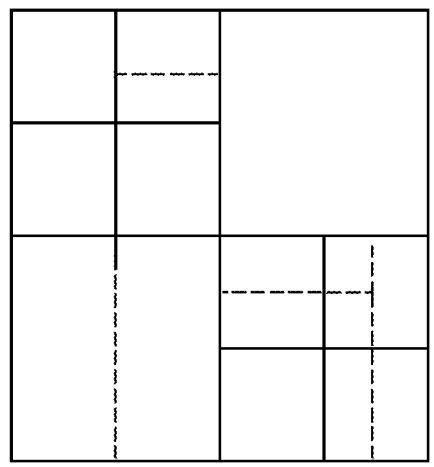
FIG. 1 shows Quad-Tree Plus Binary-Tree (QTBT) CTU representation.
Figure 2:
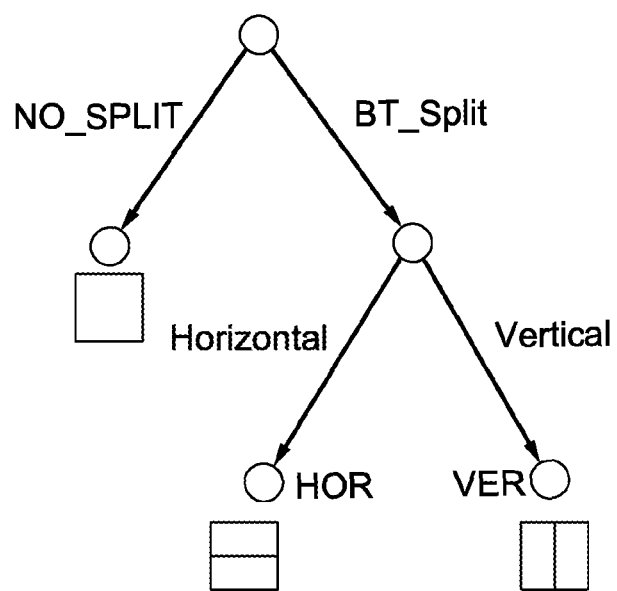
FIG. 2 shows Binary-Tree split mode syntax in JEM3.0.
Figure 3:
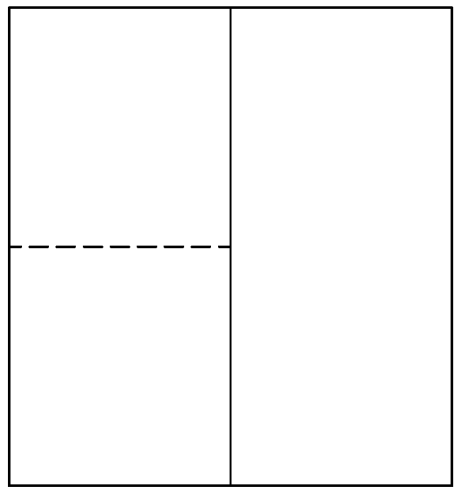
FIG. 3 shows a block split vertically and the first partition split horizontally.
Figure 4:
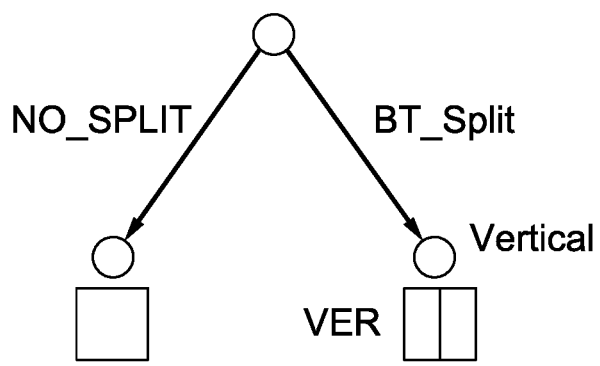
FIG. 4 shows syntax in JEM3.0 for horizontal split constraint.
Figure 5:
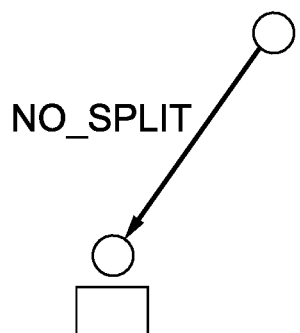
FIG. 5 shows syntax in JEM3.0 for horizontal split constraint a current block with a minimum width constraint.
Figure 6:
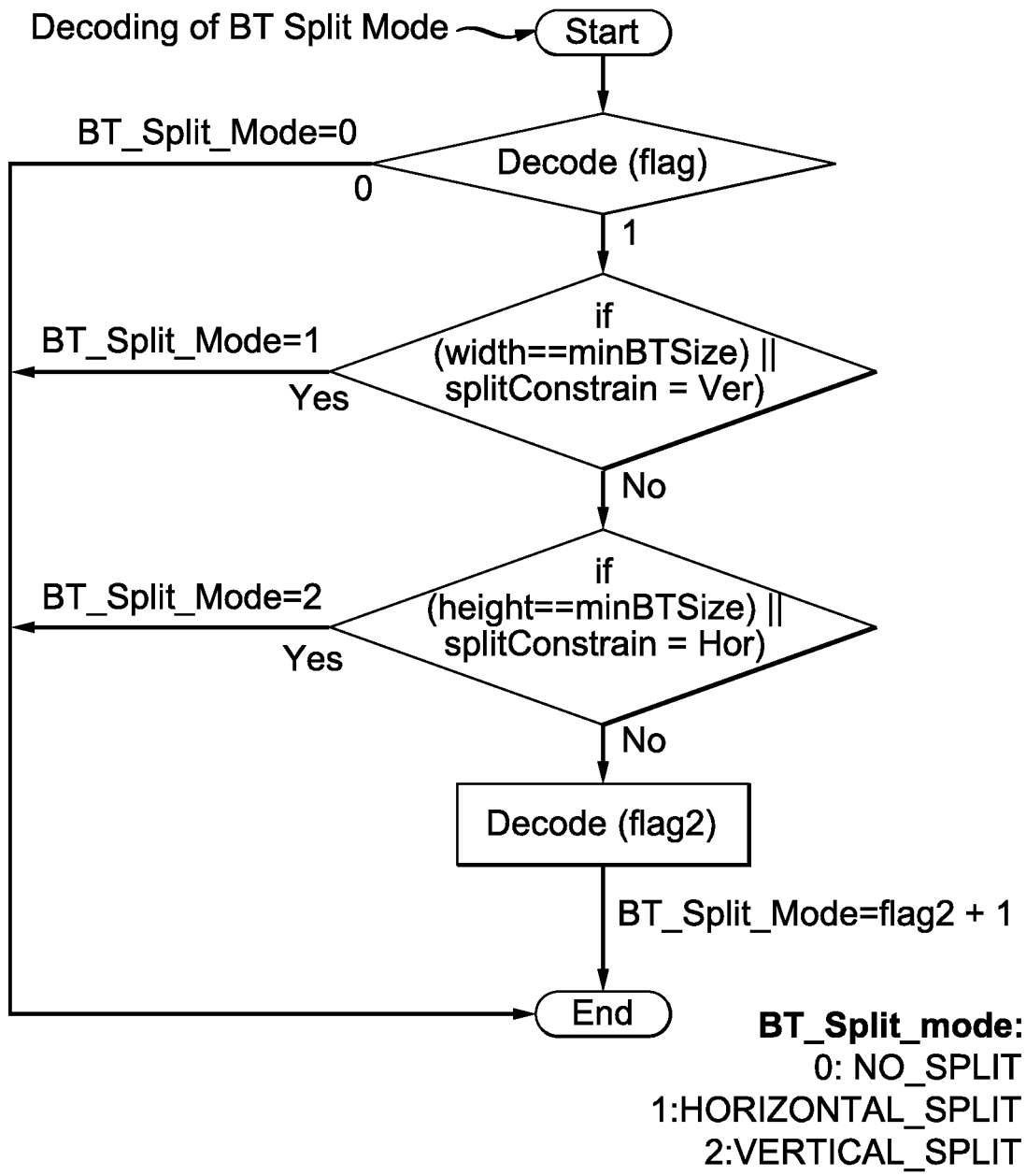
FIG. 6 shows a flowchart of BTMode decoding in JEM3.0.
Figure 7:
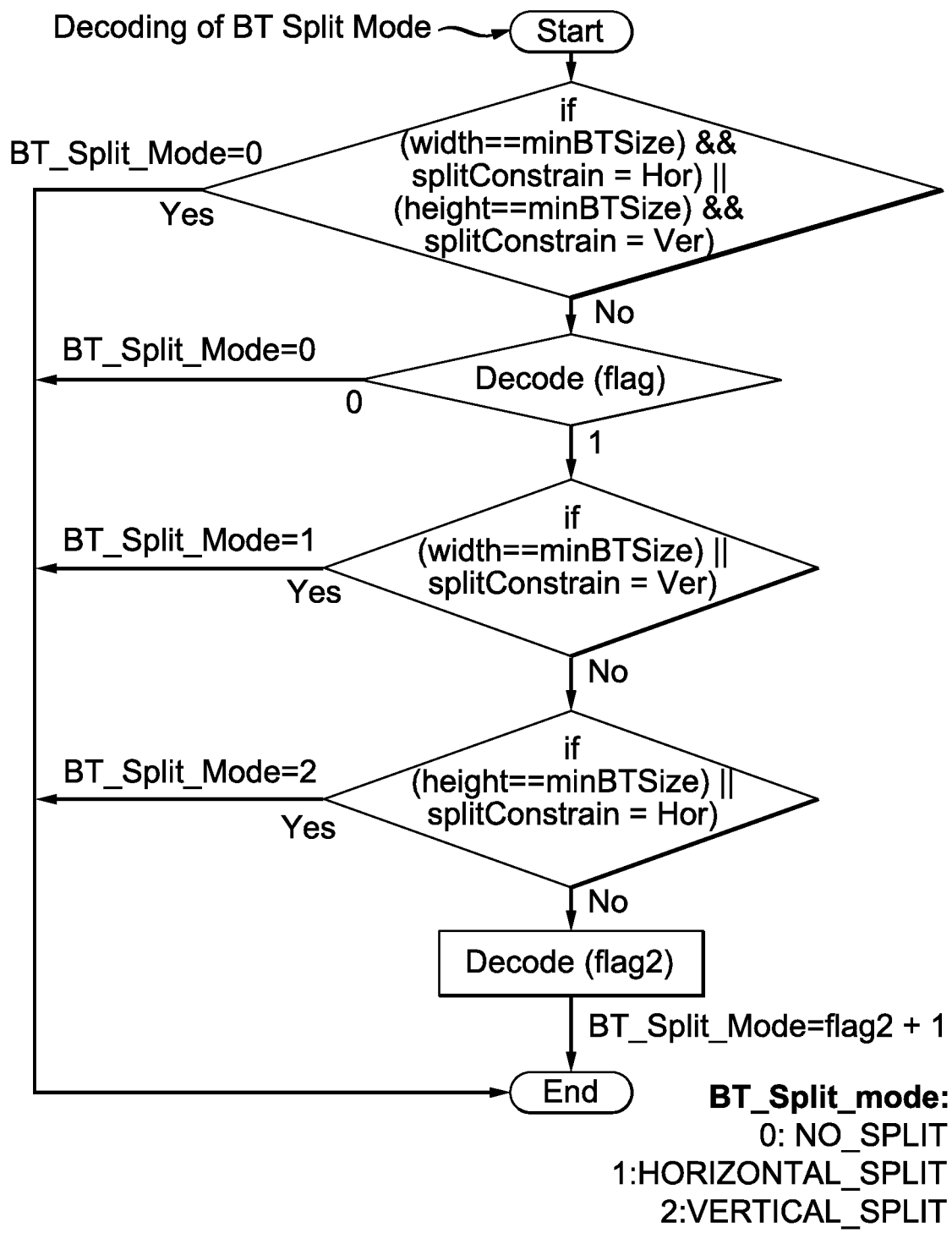
FIG. 7 shows a flowchart of BTMode decoding according to the aspects described herein.

In the current syntax, a first flag indicates if the block is split or not. If the block is split, a second flag indicates horizontal or vertical partitioning. In some case, the succession of horizontal and vertical partitioning may lead to simulating the Quad-Tree. To avoid such a case, a split constraint is used to forbid a direction of binary split. In FIG. 3, a block is first divided vertically then the first partition is split horizontally. In this case, for the second partition, a horizontal split constraint may be added to avoid simulating the Quad-Tree with the Binary-Tree.

A combination of MinBTSize parameter and split constraint may give a block that cannot be split. The current syntax of existing digital video compression standards does not take into account such a situation. For example, in FIG. 3, if the starting block is 8×8 and minBTSize=4, the second partition is 4×8 and cannot be split either in a horizontal or vertical direction. In the current syntax, a flag that indicates no split is always coded in such a case.

The described embodiments add a step of checking all the parameters that forbid one Binary-Tree split mode before the coding of the BTsplitMode syntax element. This additional step ensures that the current block may be split at least in one direction or else it is inferred that there is no additional splitting, that is, the BTSplitMode may be inferred to be NO_SPLIT.

In a first embodiment, we use minBTSize and SplitConstrain properties to check availability of BTSplitModes. This checking step is done in the Entropy coding or decoding module and is done in the same way at both the encoder and decoder sides.

In the example of FIG. 3, the condition (width_minBTSize && splitConstrain=Hor) is true, so BT_Split_mode is inferred to be NO_SPLIT.

Figures 8, 9:
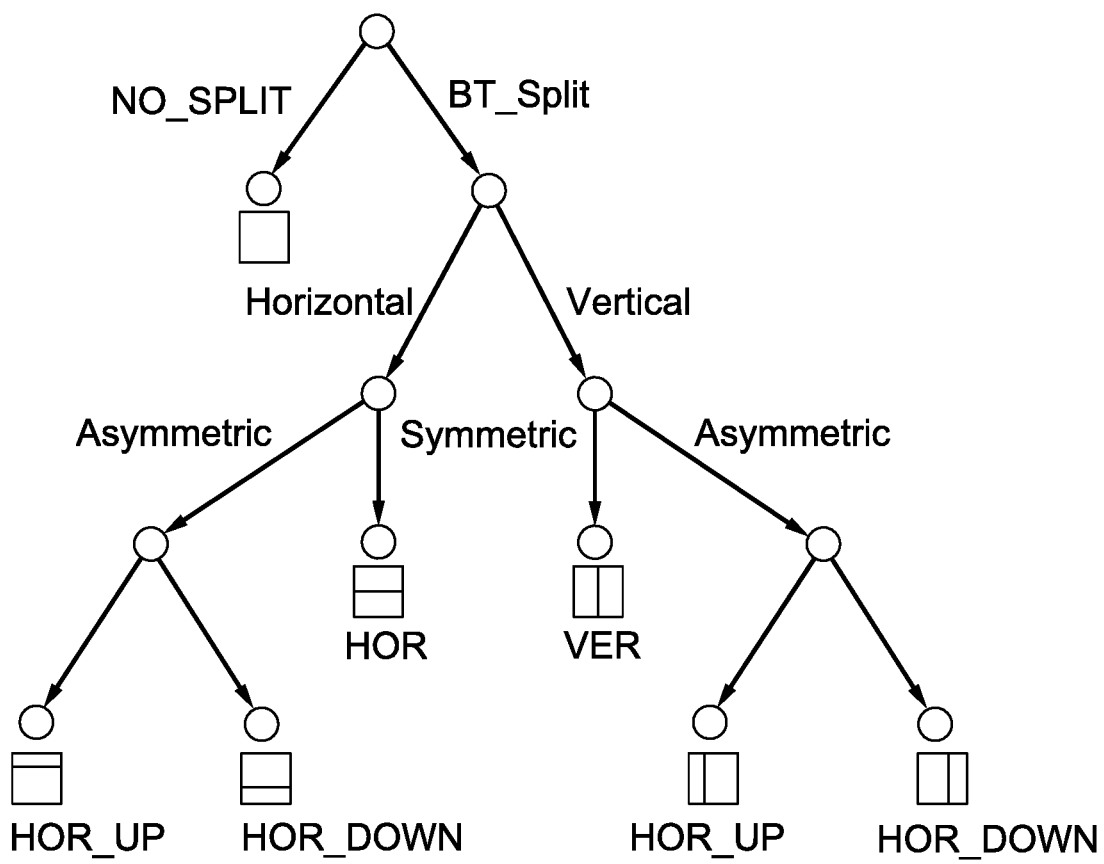
FIG. 8 shows results for a proposed solution in inter configuration compared to JEM3.0.
FIG. 9 shows a Binary-Tree split mode syntax for asymmetric coding units according to the aspects described herein.
Figure 10:
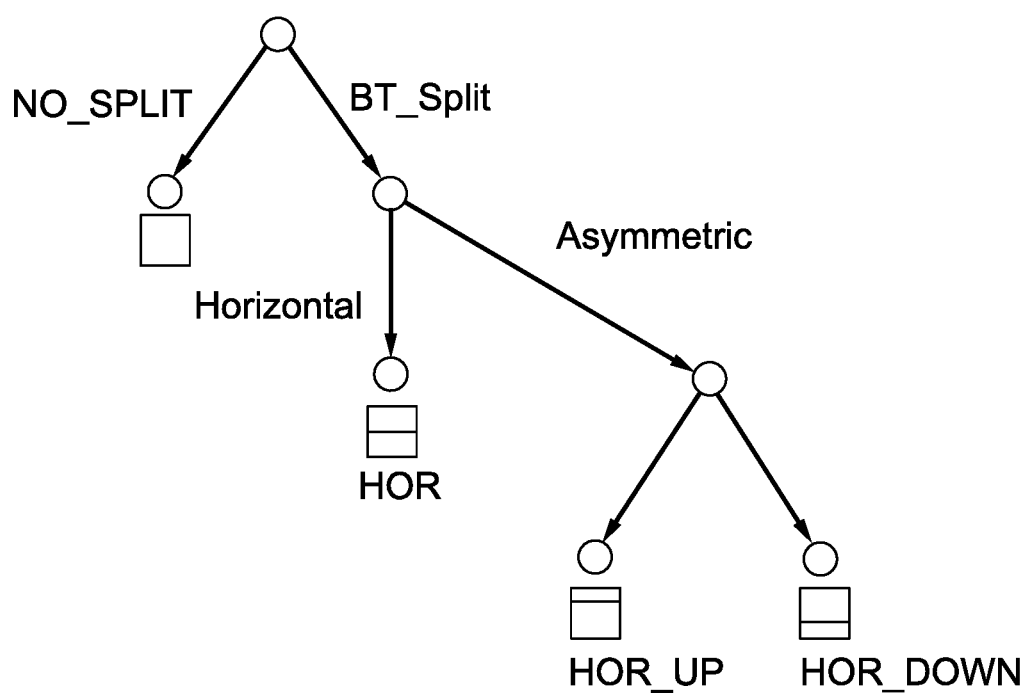
FIG. 10 shows Binary-Tree split mode syntax for asymmetric coding units with a minimum width constraint according to the aspects described herein.

FIG. 8 shows the compression performance obtained with the proposed syntax for Binary-Tree split mode in JEM3.0 (Joint Exploration Model 3). This results are obtained in Random-Access, Low-Delay and Low-Delay-P configurations of the official JVET testing conditions.

Figure 14:
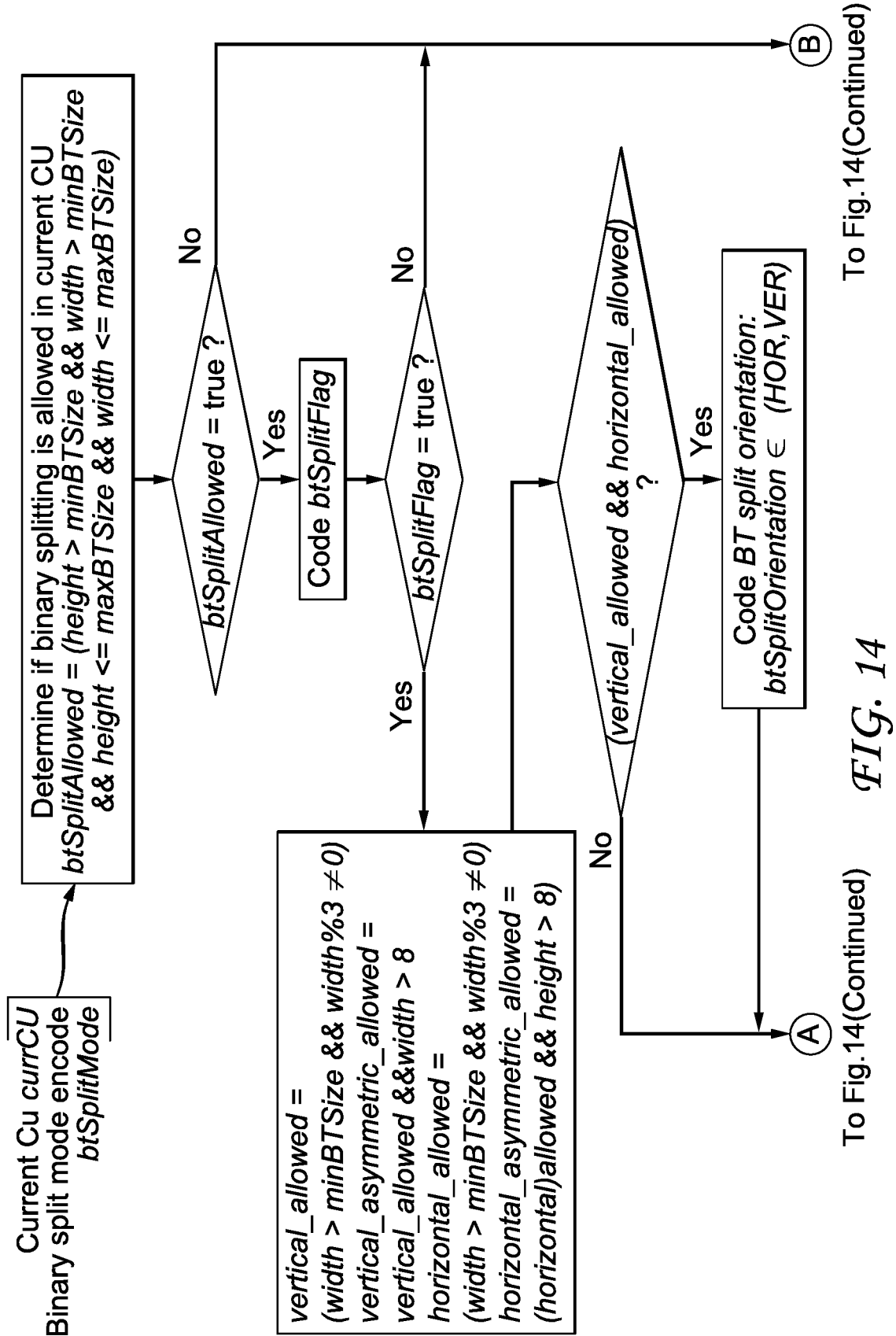
FIG. 14 shows Binary Splitting Mode Coding process proposed by one embodiment described herein.
Figure 14:
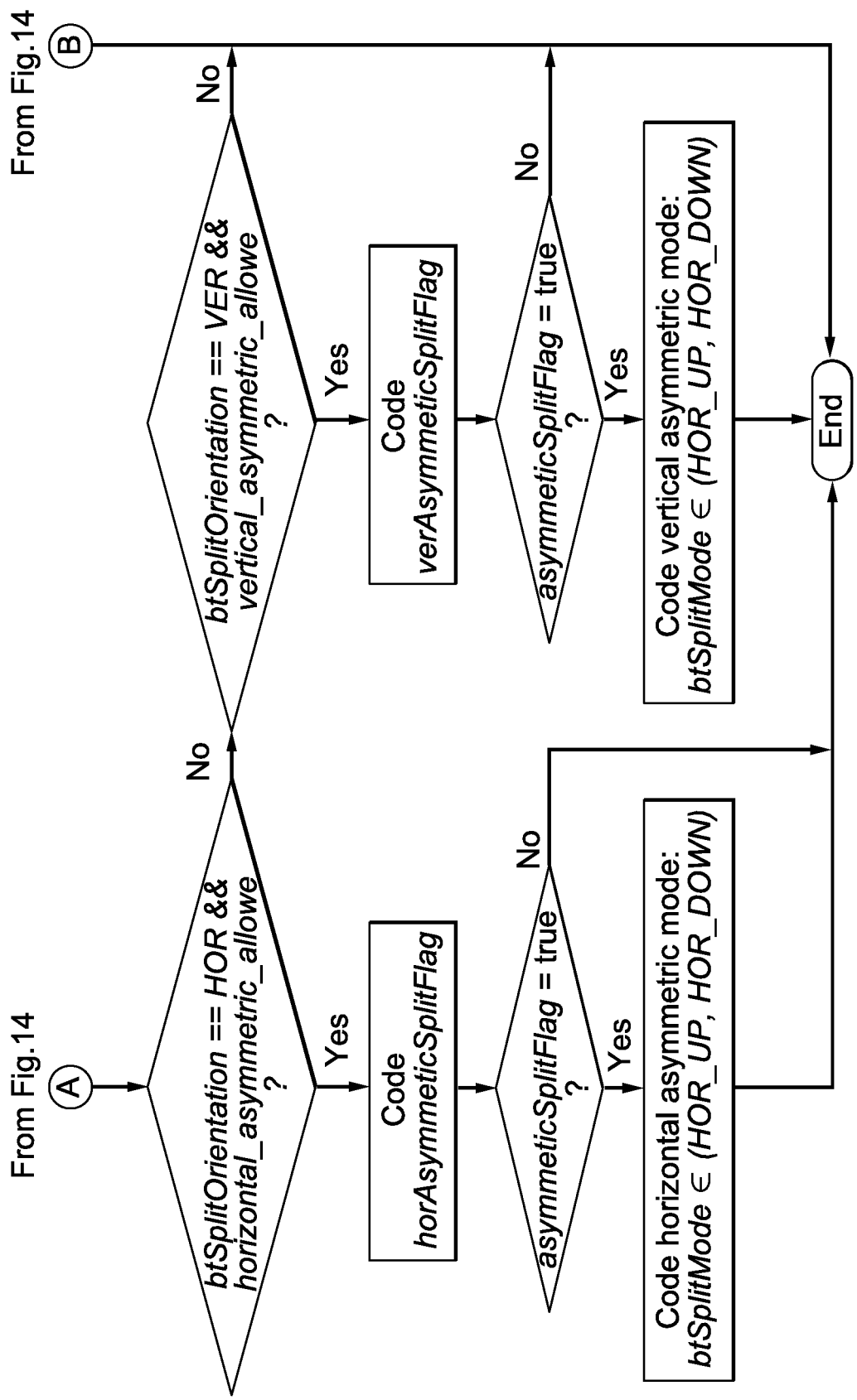

Consider another embodiment shown in FIG. 14 that depicts the algorithm used to encode the Binary Split Mode, according to a first embodiment of the invention. The input to this process is the CU currently being coded, and the Binary Split Mode chosen for this CU. The CU is either split in a binary fashion, or is not split, at this stage of the overall CU coding process.

The first step of the algorithm of FIG. 14 checks if binary splitting of a current CU is allowed. This typically consists in checking if the current CU, rectangular or square, is comprised between the minimum and maximum Binary Tree CU size, in width and height. If not, this means the CU is not split, no syntax element is coded at all and the algorithm is over.

In the contrary case, a first flag is encoded to signal if the current CU is split or not. Next, if a current CU is in a NO_SPLIT state, then the algorithm of FIG. 14 ends. In the contrary case, the next step consists in evaluating if horizontal, vertical, asymmetric horizontal and asymmetric vertical splitting modes are respectively allowed for the current CU. In this embodiment, this takes the following form:

vertical_allowed=(width>minBTSize && width%3≠0)

vertical_asymmetric_allowed=vertical_allowed && width>8 horizontal_allowed=(width>minBTSize && width%3≠0)

horizontal_asymmetric_allowed=(horizontal_allowed && height>8)

which means that if the CU has already split in an asymmetric way, then further splitting of the CU is not allowed in the direction in which the CU has a size multiple of 3. Moreover, some restriction on the CU size is made to allow the asymmetric splitting of the CU. Typically, the CU size should be higher than 8, which means the minimum size multiple 3 issued from asymmetric splitting is 12.

According to another embodiment, the binary splitting of a CU is allowed, given that the CU to split has a size equal to $3 \cdot 2^n$, n≥1, which means the splitting of a CU could lead to a CU size of 3.

According to another embodiment, the asymmetric splitting of a CU is allowed given that a size higher than or equal to 8, and is a power of 2. For instance, this allows an asymmetric split of a CU with size 8×4 into two sub coding units with sizes 6×2 and 2×2. This may be possible in particular in the Chroma component where the QTBT tool allows block sizes down to 2.

The next step of the algorithm of FIG. 14 tests if both horizontal and vertical splitting are allowed for a current CU. If so, a flag is coded to indicate the binary splitting orientation (horizontal or vertical) noted btSplitOrientation. If horizontal of vertical splitting is not allowed, then this flag is not coded, and the binary splitting orientation will be inferred on the decoder side.

Next, the process tests, for the relevant splitting orientation used, if the asymmetric splitting mode is allowed along this orientation. If not, the algorithm is over and no further syntax element if coded. The splitting mode will be inferred to be HOR or VER on the decoder side, depending on the btSplitOrientation value.

Otherwise, a flag is encoded if asymmetric splitting is used for current CU. If not, the algorithm is over. If asymmetric splitting is used, then the asymmetric splitting is signaled through a flag, which indicates that:

HOR_UP or HOR_DOWN is used if horizontal splitting orientation is active

VER_LEFT or VER_RIGHT is used if vertical splitting orientation is active.

Figure 15:
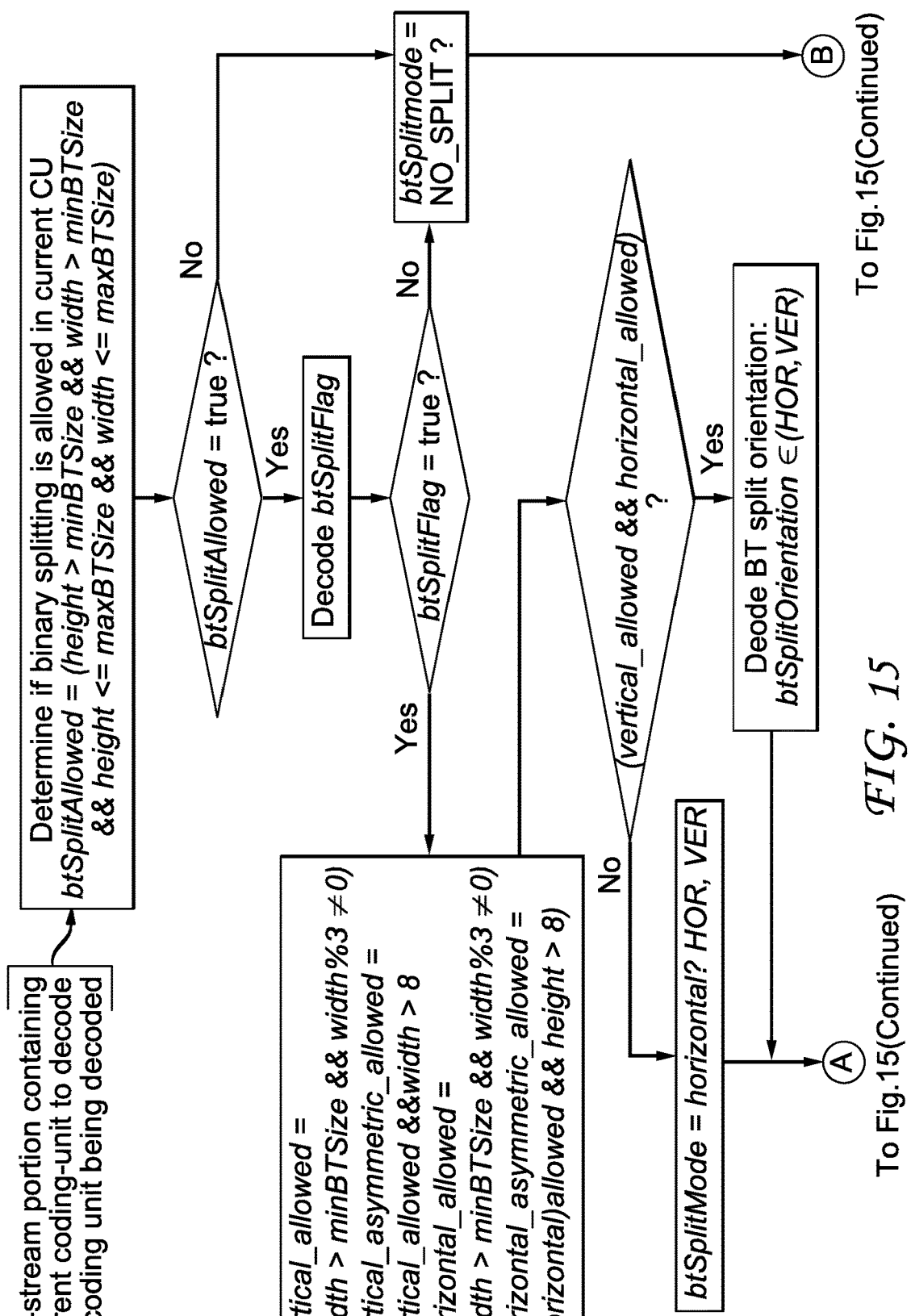
FIG. 15 shows Binary Splitting Mode parsing process proposed by one embodiment described herein.
Figure 15:
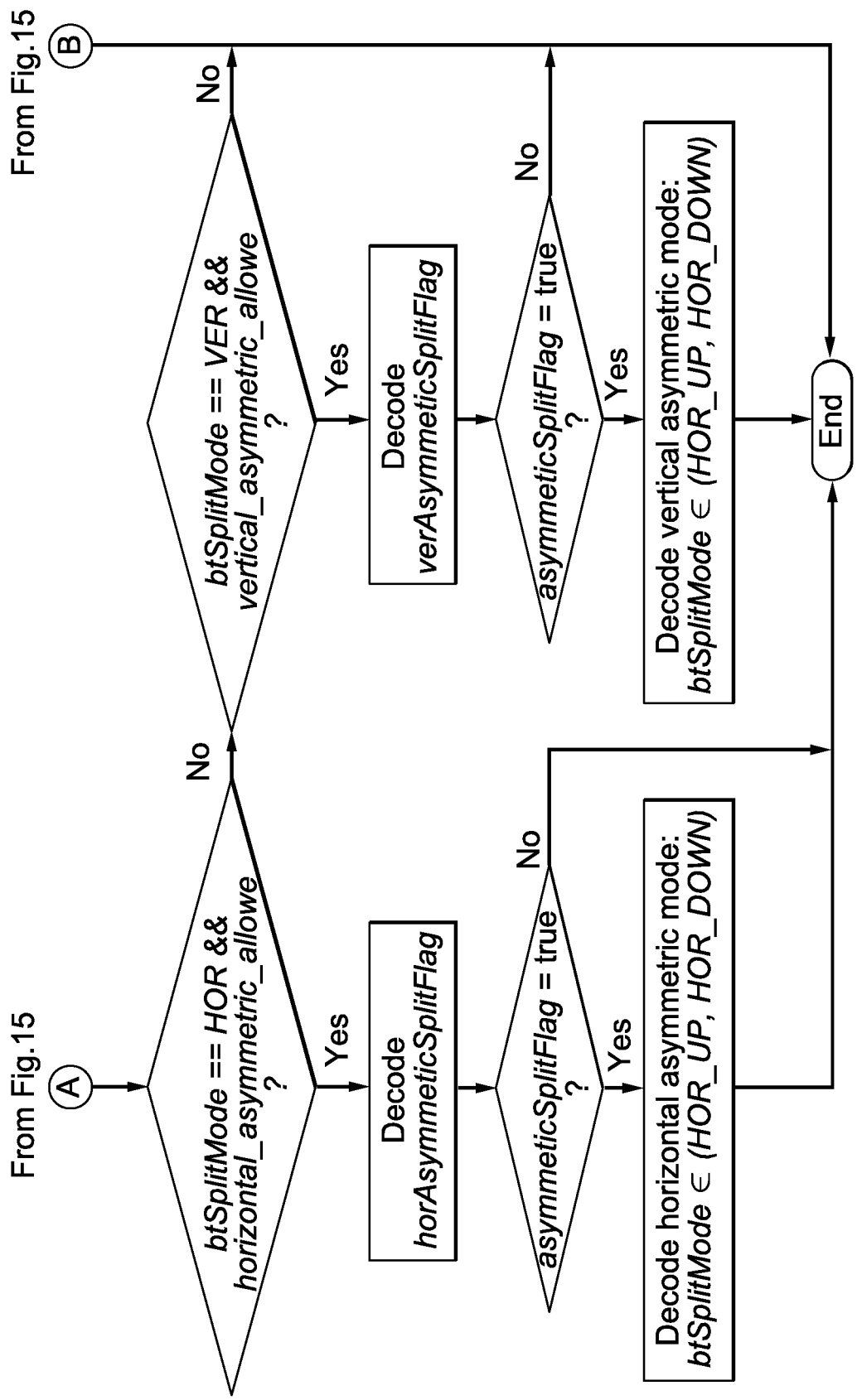
Figure 16:
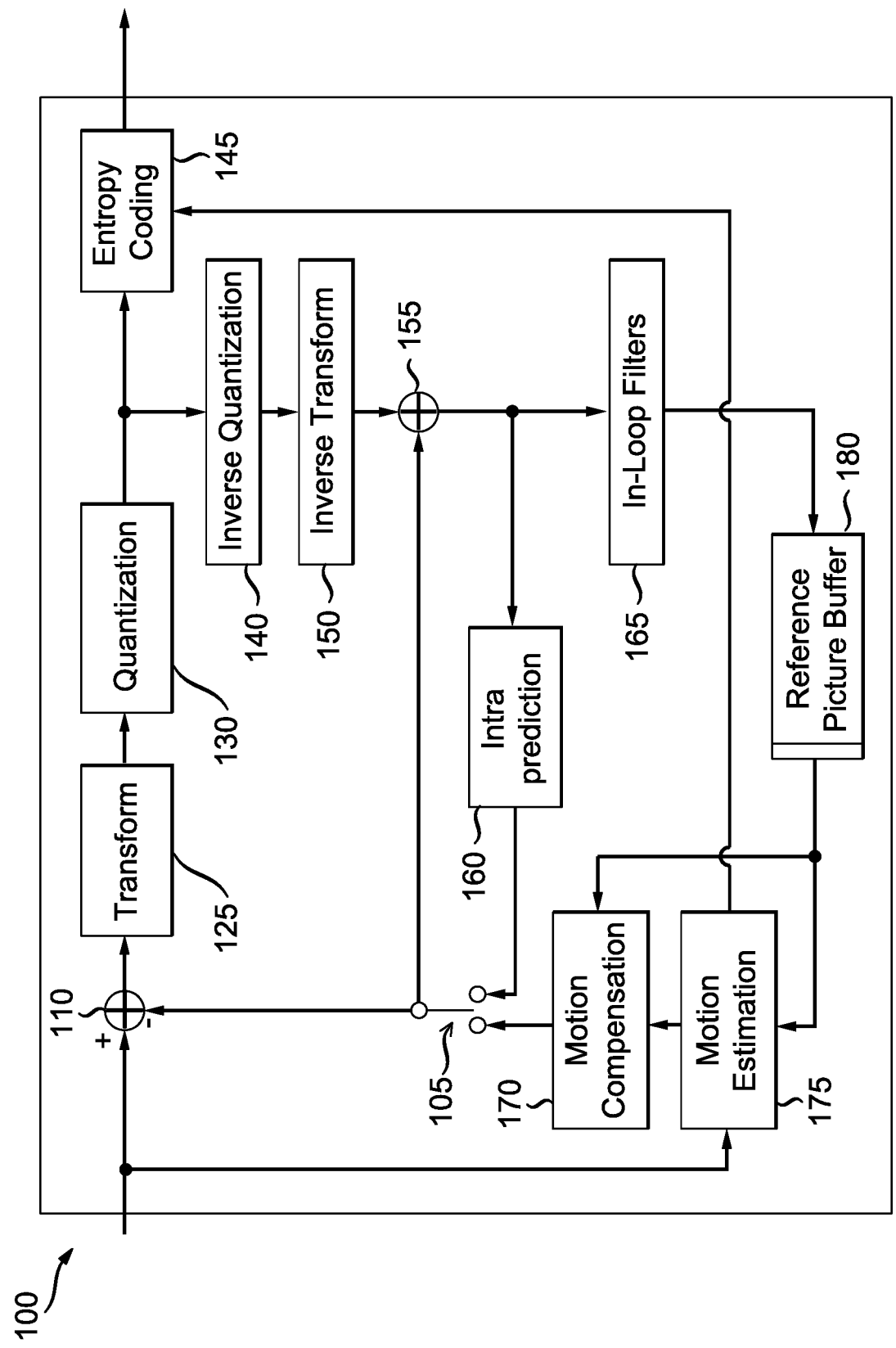
FIG. 16 show an exemplary encoder to which the present embodiments can be applied.
Figure 17:
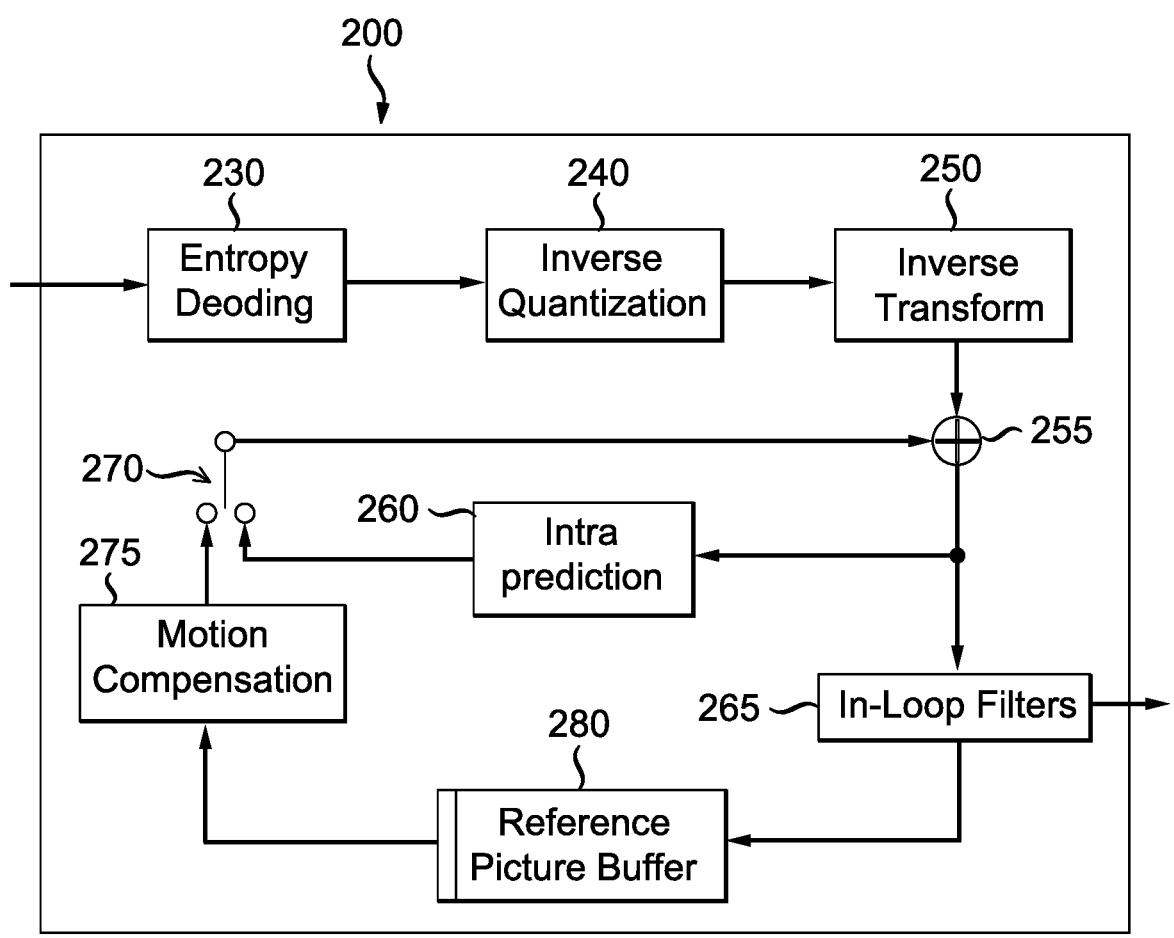
FIG. 17 show an exemplary encoder to which the present embodiments can be applied.

The decoder size binary tree split mode parsing process is shown of FIG. 15. This is the reciprocal of the coding process of FIG. 14.

The input to the process is the coded bit-stream and the current CU to decode. The first step checks if binary splitting of a current CU is allowed, exactly in the same way as the on encoder side. If not, this means the CU is not split, no syntax element is coded at all and the algorithm is over.

In the contrary case, a flag is decoded to signal if the current CU is split or not. Next, if the current CU is in NO_SPLIT state, then the parsing process is over.

In the contrary case, the next step consists in evaluating if horizontal, vertical, asymmetric horizontal and asymmetric vertical splitting are respectively allowed for the current CU, exactly as on the encoder side.

Next, if both horizontal and vertical splitting are allowed for current CU, a flag is coded to indicate the binary splitting orientation (horizontal or vertical), noted as btSplitOrientation. If horizontal of vertical splitting is not allowed, then this flag is not coded, and the binary splitting orientation is inferred.

Next, the process tests, for the used splitting orientation, if the asymmetric splitting mode is allowed along this orientation. If not, the algorithm is over and no further syntax element if decoded. The splitting mode is inferred to be HOR or VER, depending on the btSplitOrientation value.

Otherwise, test if asymmetric splitting is used for current CU. If not, the algorithm is over. If yes, a last flag is decoded, to indicate which type of asymmetric splitting is used. The flag indicates that:

HOR_UP or HOR_DOWN is used if horizontal splitting orientation is active

VER_LEFT or VER_RIGHT is used if vertical splitting orientation is active.

Figure 11:
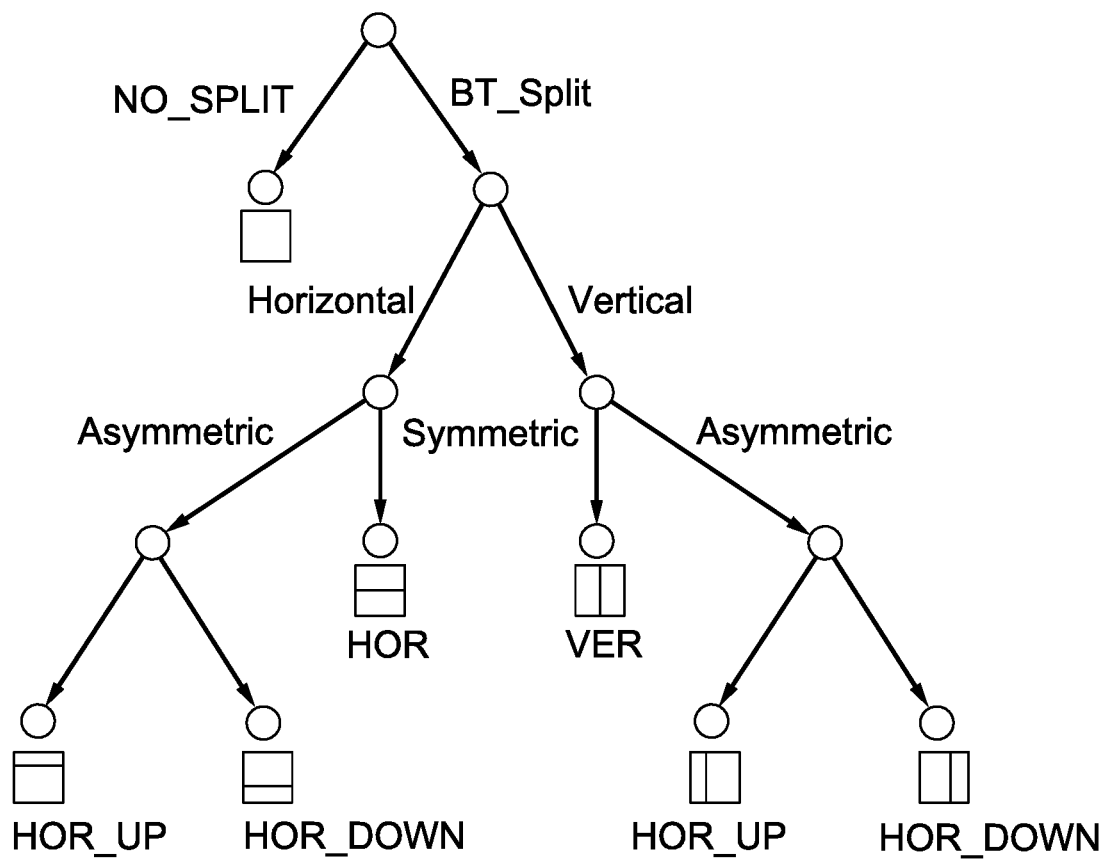
FIG. 11 shows Binary-Tree split mode syntax for asymmetric coding units with a horizontal split constraint according to the aspects described herein.

In another embodiment, more BTSplitModes are available, as just described above. The checking step proposed herein uses new properties from the new BTSplitModes available. If width or height of the current block is equal to minBTSize, the block cannot be split any further. The splitConstrain precludes use of one given BTSplitMode (see FIG. 11).

In one embodiment, asymmetric CUs are enabled for only certain size of blocks (16 and 32). This information may also be used in the checking step before coding BTSplitMode.

Figure 12:
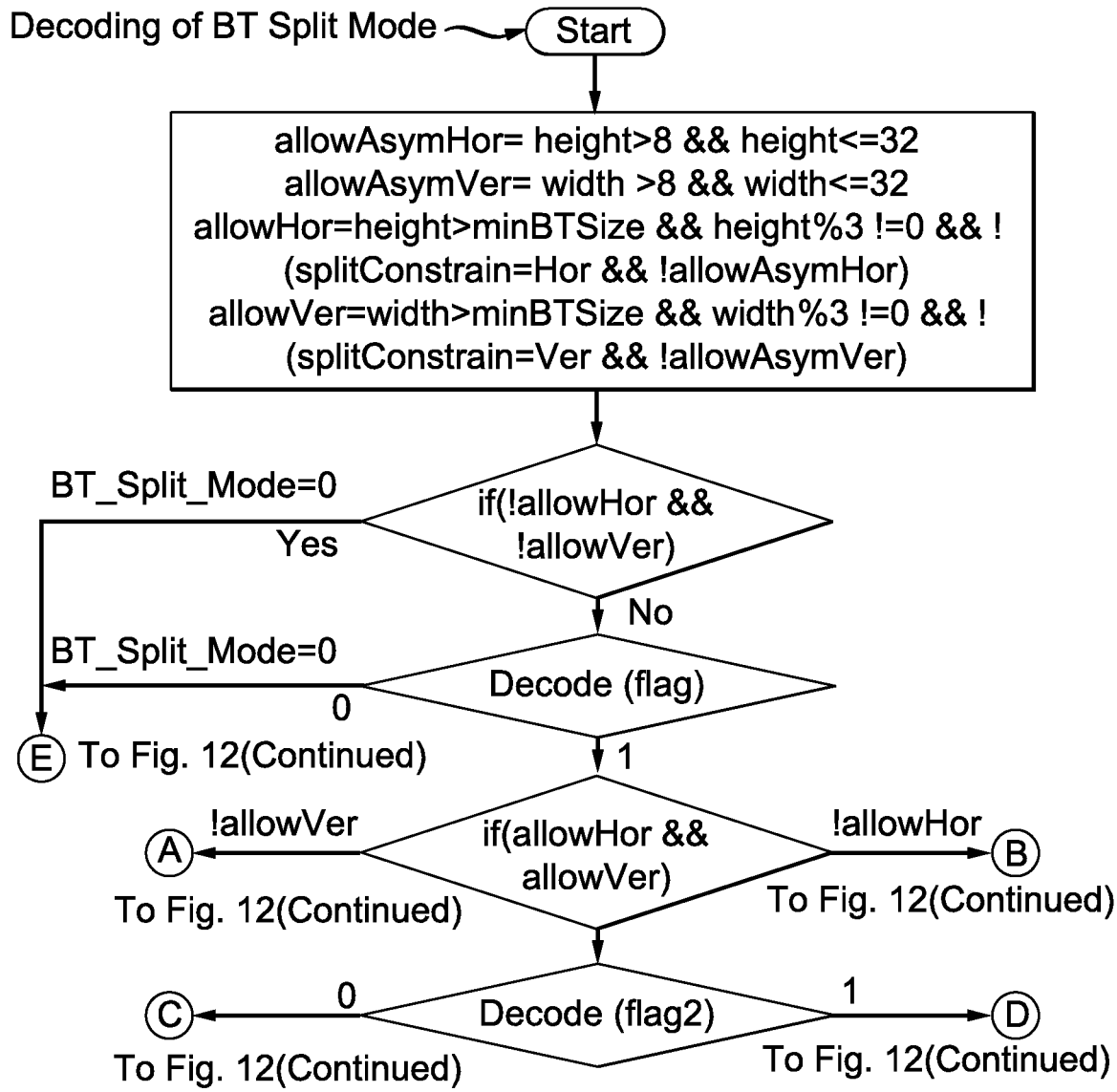
FIG. 12 shows Binary-Tree split mode syntax for asymmetric coding units under the proposed method described herein.
Figure 12:
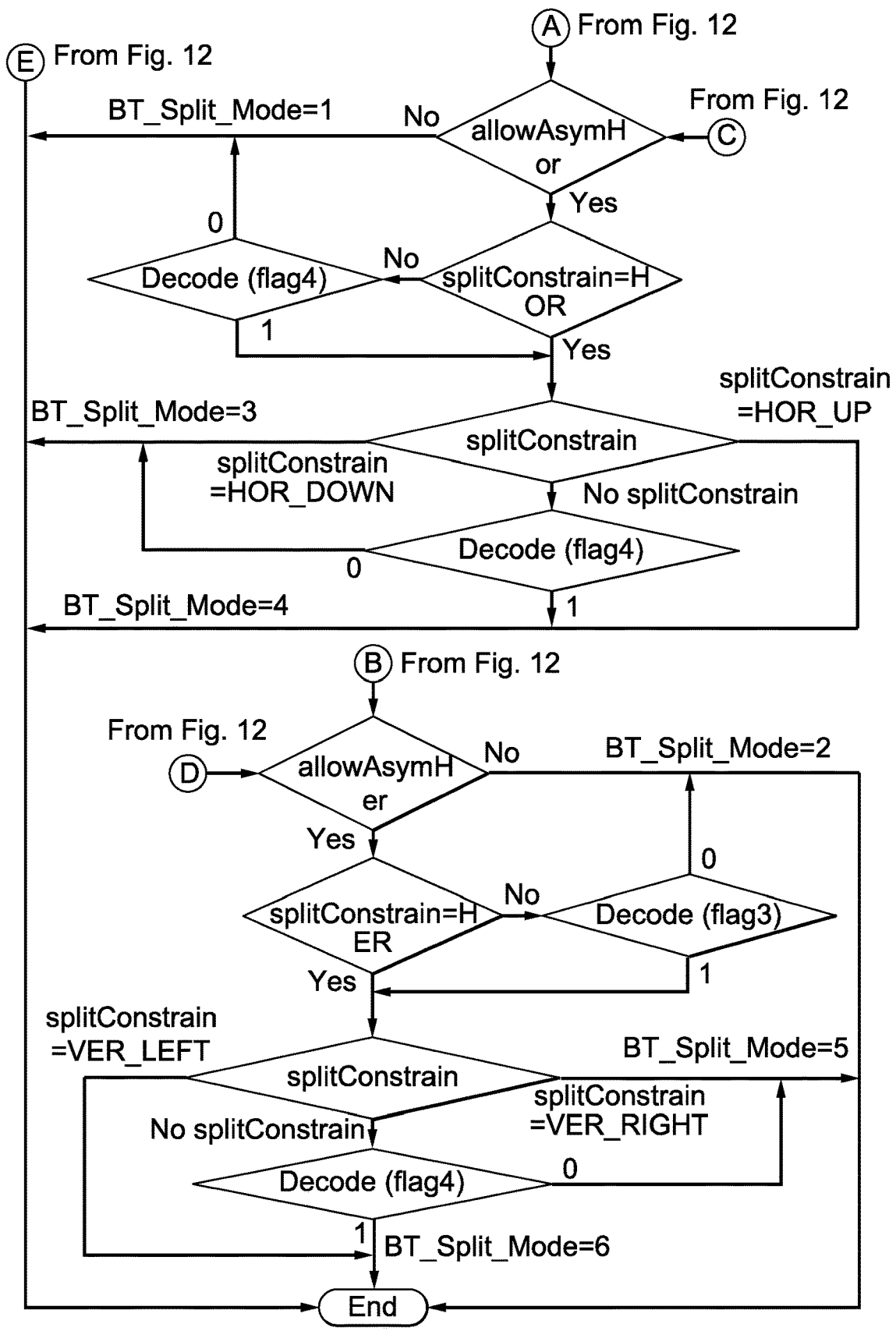
Figures 19, 20:
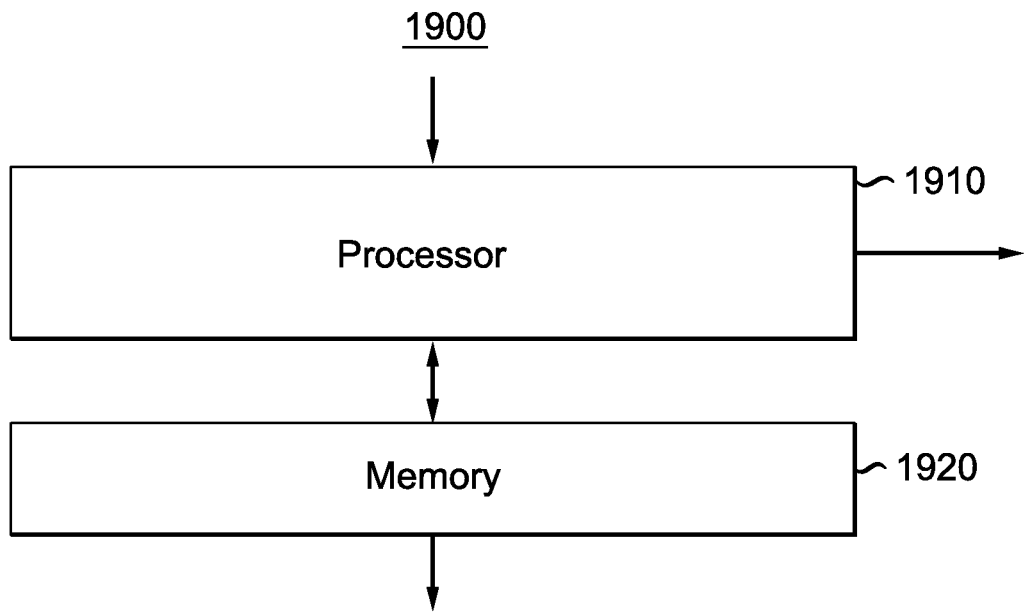
FIG. 19 shows one embodiment of an apparatus for encoding or decoding digital video blocks under the present aspects.
FIG. 20 shows the compression performance obtained with the proposed syntax using the present aspects for Binary-Tree split mode if asymmetric CUs are enabled.

Assume in the flowchart of FIG. 12 that Asymmetric CUs are allowed only for the size 16 and 32. And if the size of one block side is a multiple of 3, it cannot be further split. FIG. 20 shows the compression performance obtained with the proposed syntax for Binary-Tree split mode if asymmetric CUs are enabled. These results are obtained in the All-Intra configuration of the official JVET testing conditions specified in "JVET common test conditions and software reference configurations", Document: JVET-B1010, Joint Video Exploration Team (JVET) of ITU-T SG16 WP3 and ISO/IEC JTC1/SC29/WG11, 2nd Meeting: San Diego, USA, 20-26 Feb. 2016.

Figure 13:
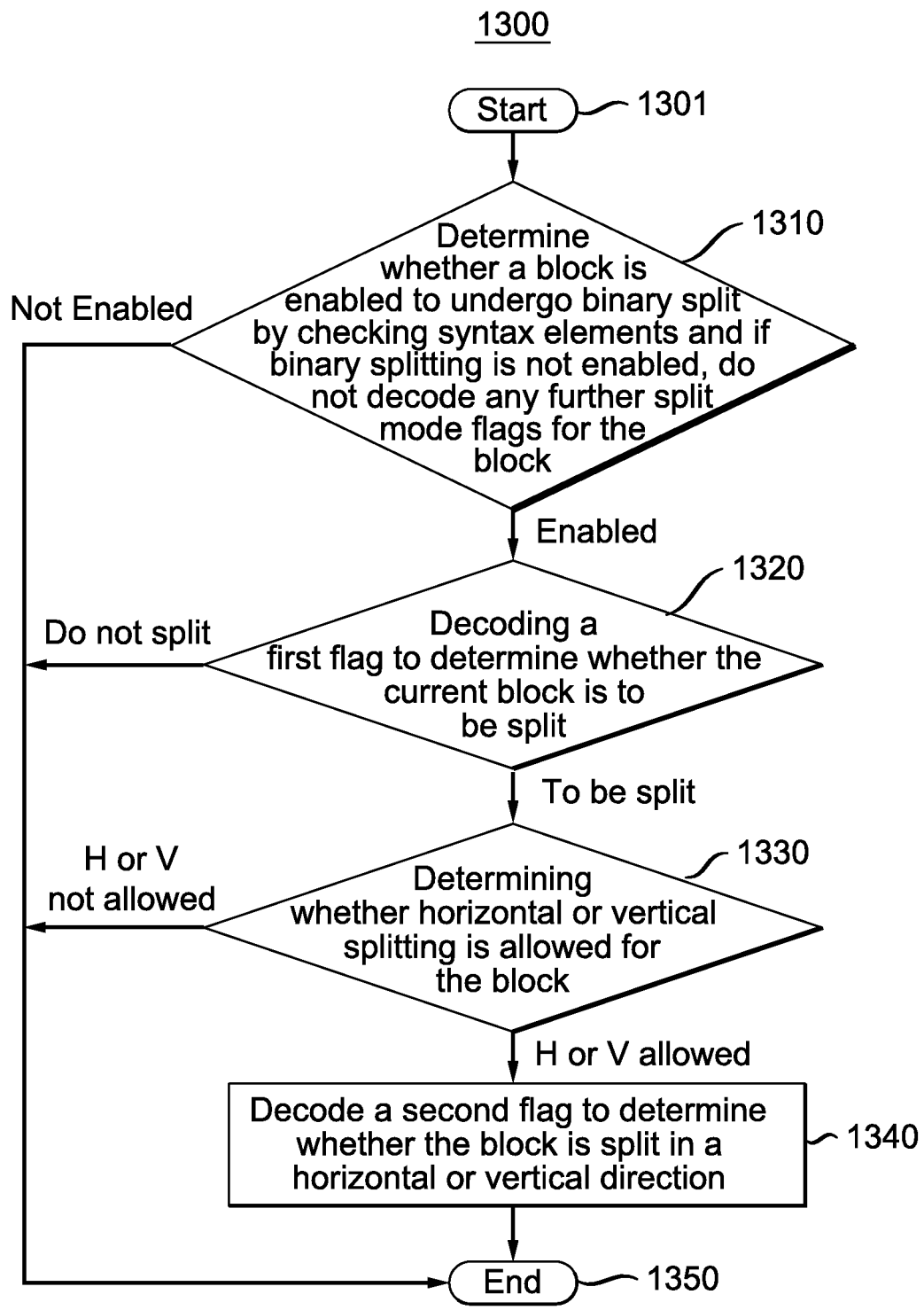
FIG. 13 shows one embodiment of a method for decoding digital video blocks under the present aspects.

One embodiment of a method 1300 for decoding video image blocks in an entropy decoder under the present principles is shown in FIG. 13. The method commences at block 1301 and proceeds to block 1310 for determining whether a block is enabled to undergo binary splitting by checking syntax elements representative of a minimum block size and splitting constraints, and if binary splitting is not enabled, do not decode any further split mode flags for the block. Control then proceeds from block 1310 to block 1320, if binary splitting is enabled, for decoding a first flag to determine whether the block is to be split. Control then proceeds from block 1320 to block 1330 for determining whether horizontal or vertical splitting is allowed for the block, if binary splitting is allowed, by checking syntax elements representative of a minimum block size and horizontal and vertical splitting constraints. If horizontal or vertical splitting are allowed, control proceeds from block 1330 to block 1340 for decoding a second flag to determine whether the block is split in a horizontal or vertical direction. If any of the conditions in blocks 1310, 1320 or 1330 are not allowed, control proceeds from those blocks directly to block 1350 where the binary tree split mode coding ends.

Figure 18:
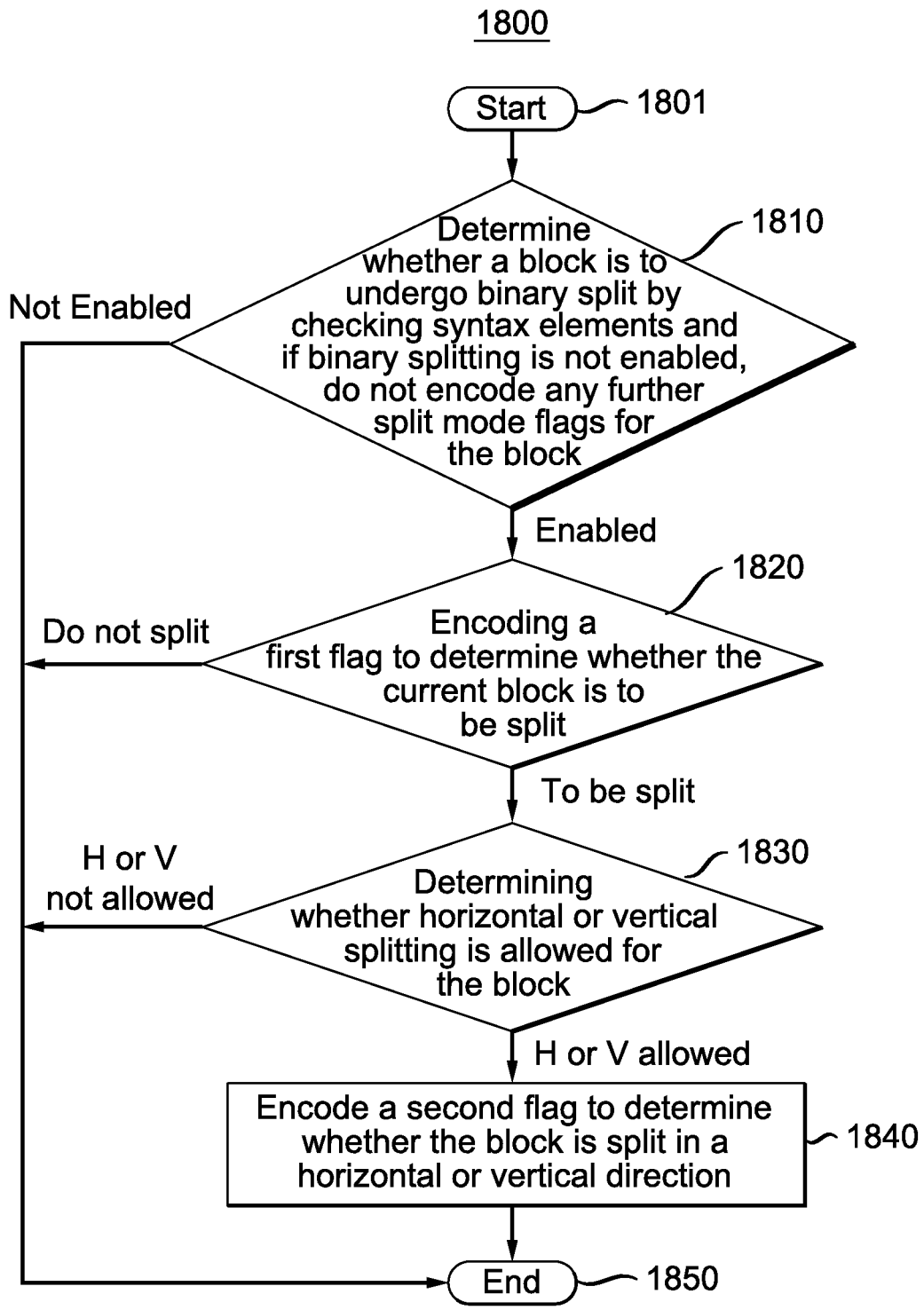
FIG. 18 shows one embodiment of a method for encoding digital video blocks under the present aspects.

Another embodiment of a method 1800 for encoding video image blocks in an entropy encoder under the present principles is illustrated in FIG. 18. The method commences at block 1801 and proceeds to block 1810 for determining whether a block is to undergo binary splitting by checking its block size relative to a minimum block size and whether there are any splitting constraints, and if binary splitting is not to be enabled, do not encode any further split mode flags for the block. If binary splitting is enabled, control proceeds from block 1810 to block 1820 for encoding a first flag to indicate whether the block is to be split. If the flag indicates the block is to be split, control proceeds from block 1820 to block 1830 for determining whether horizontal or vertical splitting is allowed for the block by checking its block size relative to a minimum block size and whether there are horizontal and vertical splitting constraints. If horizontal or vertical splitting is allowed, control proceeds from block 1830 to block 1840 for encoding a second flag to indicate whether the block is split in a horizontal or vertical direction. If any of the conditions in blocks 1810, 1820 or 1830 are not allowed, control proceeds from those blocks directly to block 1850 where the binary tree split mode coding ends. The decision as to whether a block, coding unit, or other structure should be split at an encoder can be made by evaluating potential coding efficiency, for example.

One embodiment of an apparatus 1900 for encoding or decoding the binary tree split mode flags using the present principles is illustrated in FIG. 19. The apparatus is comprised of Processor 1910 interconnected to Memory 1920. Instructions in Memory 1920 cause Processor 1910 to execute instructions to implement the method of either FIG. 13 or FIG. 18 on digital video image data or coded digital video image data, which may be input on one of the input ports of Processor 1910 or stored in Memory 1920.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller"

should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The invention claimed is:

1. A method of decoding video image blocks in an entropy decoder, comprising:
   determining whether a block is enabled to undergo binary splitting by checking syntax elements representative of a minimum block size and splitting constraints, and if binary splitting is not enabled, do not decode any further split mode flags for the block;
   decoding a first flag to determine whether the block is to be split if binary splitting is enabled;
   determining whether horizontal or vertical splitting is allowed for the block if binary splitting is allowed by checking syntax elements representative of a minimum block size and horizontal and vertical splitting constraints, and
   decoding a second flag to determine whether the block is split in a horizontal or vertical direction, wherein asymmetric coding unit blocks are enabled by using two additional flags to indicate whether a horizontally split block is split at a top or bottom side of the block or a vertically split block is split in a left or right side of the block.

2. The method of claim 1, wherein asymmetric coding units comprise blocks of size 16.

3. The method of claim 1, wherein asymmetric coding units comprise blocks of size 32.

4. A method of encoding video image blocks in an entropy encoder, comprising:
   determining whether a block is to undergo binary splitting by checking its block size relative to a minimum block size and whether there are any splitting constraints, and if binary splitting is not to be enabled, do not encode any further split mode flags for the block;
   encoding a first flag to indicate whether the block is to be split if binary splitting is enabled;
   determining whether horizontal or vertical splitting is allowed for the block if binary splitting is allowed by checking its block size relative to a minimum block size and whether there are horizontal and vertical splitting constraints, and
   encoding a second flag to indicate whether the block is split in a horizontal or vertical direction, wherein asymmetric coding unit blocks are enabled by using two additional flags to indicate whether a horizontally split block is split at a top or bottom side of the block or a vertically split block is split in a left or right side of the block.

5. The method of claim 4, wherein asymmetric coding units comprise blocks of size 16.

6. The method of claim 4, wherein asymmetric coding units comprise blocks of size 32.

7. An apparatus for decoding video image blocks in an entropy decoder, comprising:
   a memory, and
   a processor, configured to decode video image blocks by:
      determining whether a block is enabled to undergo binary splitting by checking syntax elements representative of a minimum block size and splitting constraints, and if binary splitting is not enabled, do not decode any further split mode flags for the block;
      decoding a first flag to determine whether the block is to be split if binary splitting is enabled;
      determining whether horizontal or vertical splitting is allowed for the block if binary splitting is allowed by checking syntax elements representative of a minimum block size and horizontal and vertical splitting constraints, and
      decoding a second flag to determine whether the block is split in a horizontal or vertical direction, wherein asymmetric coding unit blocks are enabled by using two additional flags to indicate whether a horizontally split block is split at a top or bottom side of the block or a vertically split block is split in a left or right side of the block.

8. The apparatus of claim 7, wherein asymmetric coding units comprise blocks of size 16.

9. The apparatus of claim 7, wherein asymmetric coding units comprise blocks of size 32.

10. An apparatus for encoding video image blocks in an entropy encoder, comprising:
a memory, and
a processor, configured to decode video image blocks by:
determining whether a block is to undergo binary splitting by checking its block size relative to a minimum block size and whether there are any splitting constraints, and if binary splitting is not to be enabled, do not encode any further split mode flags for the block;
encoding a first flag to indicate whether the block is to be split if binary splitting is enabled;
determining whether horizontal or vertical splitting is allowed for the block if binary splitting is allowed by checking its block size relative to a minimum block size and whether there are horizontal and vertical splitting constraints, and
encoding a second flag to indicate whether the block is split in a horizontal or vertical direction, wherein asymmetric coding unit blocks are enabled by using two additional flags to indicate whether a horizontally split block is split at a top or bottom side of the block or a vertically split block is split in a left or right side of the block.

11. The apparatus of claim 10, wherein asymmetric coding units comprise blocks of size 16.

12. The apparatus of claim 10, wherein asymmetric coding units comprise blocks of size 32.

13. A nontransitory computer readable storage medium storing instructions which when executed by a processor cause the processor to perform the method according to claim 1 when the computer program is executed by one or more processors.

14. A method of decoding video image blocks in an entropy decoder, comprising:
determining whether a block is allowed to undergo splitting by checking if said block is within a minimum and a maximum allowed coding unit size in width and height and, if so, decoding a first flag to indicate whether the block is to be split and decoding syntax elements representative of a minimum block size and splitting constraints, and if splitting is not enabled, do not decode any further split mode flags for the block;
determining whether horizontal or vertical splitting is allowed for the block if binary splitting is allowed consistent with said syntax elements representative of a minimum block size and horizontal and vertical splitting constraints, and
decoding a second flag to indicate whether the block is split in a horizontal or vertical direction by checking that the block size in each direction is greater than a minimum size and also not equal to a multiple of three, and wherein additional syntax is indicative of a type of split by checking if asymmetric splitting in a direction is allowed.

15. An apparatus for decoding video image blocks, comprising:
a memory, and
a processor, configured to decode video image blocks by:
determining whether a block is allowed to undergo splitting by checking if said block is within a minimum and a maximum allowed coding unit size in width and height and, if so, decoding a first flag to indicate whether the block is to be split and decoding syntax elements representative of a minimum block size and splitting constraints, and if splitting is not enabled, do not decode any further split mode flags for the block;
determining whether horizontal or vertical splitting is allowed for the block if binary splitting is allowed consistent with said syntax elements representative of a minimum block size and horizontal and vertical splitting constraints, and
decoding a second flag to indicate whether the block is split in a horizontal or vertical direction by checking that the block size in each direction is greater than a minimum size and also not equal to a multiple of three, and wherein additional syntax is indicative of a type of split by checking if asymmetric splitting in a direction is allowed.

16. A method of encoding video image blocks in an entropy encoder, comprising:
determining whether a block is allowed to undergo splitting by checking if said block is within a minimum and a maximum allowed coding unit size in width and height and, if so, encoding a first flag to indicate whether the block is to be split and encoding syntax elements representative of a minimum block size and splitting constraints, and if splitting is not enabled, do not encode any further split mode flags for the block;
determining whether horizontal or vertical splitting is allowed for the block if binary splitting is allowed consistent with said syntax elements representative of a minimum block size and horizontal and vertical splitting constraints, and
encoding a second flag to indicate whether the block is split in a horizontal or vertical direction by checking that the block size in each direction is greater than a minimum size and also not equal to a multiple of three, and wherein additional syntax is indicative of a type of split by checking if asymmetric splitting in a direction is allowed.

17. An apparatus for encoding video image blocks, comprising:
a memory, and
a processor, configured to encode video image blocks by: determining whether a block is allowed to undergo splitting by checking if said block is within a minimum and a maximum allowed coding unit size in width and height and, if so, encoding a first flag to indicate whether the block is to be split and encoding syntax elements representative of a minimum block size and splitting constraints, and if splitting is not enabled, do not encode any further split mode flags for the block;
determining whether horizontal or vertical splitting is allowed for the block if binary splitting is allowed consistent with said syntax elements representative of a minimum block size and horizontal and vertical splitting constraints, and
encoding a second flag to indicate whether the block is split in a horizontal or vertical direction by checking that the block size in each direction is greater than a minimum size and also not equal to a multiple of three, and wherein additional syntax is indicative of a type of split by checking if asymmetric splitting in a direction is allowed.

\* \* \* \* \*